US006528181B1

(12) United States Patent
Yamane et al.

(10) Patent No.: US 6,528,181 B1
(45) Date of Patent: Mar. 4, 2003

(54) SURFACE-TREATED STEEL SHEET HAVING LOWERED CONTACT RESISTANCE AND CONNECTING TERMINAL MEMBERS MADE BY USING THE SAME

(75) Inventors: Keiji Yamane; Hitoshi Ohmura; Tatsuo Tomomori; Hideo Ohmura; Yuji Yamazaki, all of Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/554,435

(22) PCT Filed: Nov. 10, 1998

(86) PCT No.: PCT/JP98/05060

§ 371 (c)(1), (2), (4) Date: Jul. 31, 2000

(87) PCT Pub. No.: WO99/25486

PCT Pub. Date: May 27, 1999

(30) Foreign Application Priority Data

Nov. 14, 1997 (JP) ............................................ 9-329666

(51) Int. Cl.$^{7}$ ......................... B32B 15/08; B32B 15/18; C23C 10/00; H01H 1/02; C21D 1/68

(52) U.S. Cl. ....................... 428/626; 428/681; 428/648; 428/464; 428/408; 428/929; 428/941; 429/121; 427/115; 427/123; 427/383.1; 148/121; 148/527; 148/516

(58) Field of Search ................................ 428/457, 680, 428/681, 646, 648, 420, 423.1, 425.8, 458, 464, 468, 461, 460, 698, 408, 929, 941, 626; 361/306.1, 278; 429/121; 427/115, 123, 58, 383.1; 148/121, 527, 516, 559, 579

(56) References Cited

U.S. PATENT DOCUMENTS 5,993,994 A * 11/1999 Ohmura et al. ............. 429/176

FOREIGN PATENT DOCUMENTS

| | | |
|---|---|---|
| JP | 61-223195 | 10/1986 |
| JP | 7-186322 | 7/1995 |

* cited by examiner

*Primary Examiner*—Deborah Jones
*Assistant Examiner*—Michael LaVilla
(74) *Attorney, Agent, or Firm*—Browdy and Neimark

(57) ABSTRACT

A plated steel sheet and a connection terminal material using the plated steel sheet have low contact resistance and excellent corrosion resistance. The coated film, which has excellent adhesion, is formed by coating a stainless steel base sheet which is coated with a nickel-tin alloy with a solution/suspension of carbon black or graphite, carboxymethyl cellulose, and a water-borne organic resin which is acrylic resin, polyester resin, urethane resin, or phenol resin.

11 Claims, No Drawings

SURFACE-TREATED STEEL SHEET HAVING LOWERED CONTACT RESISTANCE AND CONNECTING TERMINAL MEMBERS MADE BY USING THE SAME

CROSS REFERENCE TO RELATED APPLICATION

The present application is the national stage under 35 U.S.C. 371 of PCT/JP98/05060, filed Nov. 10, 1998.

FIELD OF THE INVENTION

A plated steel sheet and a connection terminal material using same with low contact resistance and excellent corrosion resistance and adhesion of the coated film which is formed a coated film on a plated steel sheet surface using a stainless steel sheet as plated base sheet and a solution of post treatment including carbon black or graphite, carboxymethyl cellulose, and water borne organic resin composed from acrylic resin, polyester resin, urethane resin, or phenol resin is provided.

A plated steel sheet and a connection terminal material using same having low contact resistance, which is treated by diffusion treatment after nickel plating at the lower layer and tin plating thereon in case of post treatment method of stainless steel sheet, and which is treated using a water-soluble solution of post treatment including carbon black or graphite, carboxymethyl cellulose, water borne organic resin such as acrylic resin, polyester resin, urethane resin, or phenol resin.

BACKGROUND AND OBJECTIVES

The present invention relates to a surface treated steel sheet and a terminal material used thereof with superior conductivity, steadiness of conductivity after aging a lapse of time, corrosion resistance, and adhesion and low contact resistance using a stainless steel sheet as a plated base sheet.

Conventionally, a combination of carbons has been mainly used for electric connection terminal materials from the viewpoints of conductivity and corrosion resistance. Since a combination of carbons is expensive, a combination of carbon and a metal sheet has been investigated also from the viewpoint of workability. However, is has a problem of a drastic decrease of conductivity after aging due to a formation of oxide or hydroxide on the metal sheet surface.

In order to solve the problem mentioned-above, electric connection terminal materials having lower price than that of carbon and similar conductivity as that of carbon have been required.

Although using only metal material for an electric connection terminal material can be economical, it has been a problem to actually do so because of poor corrosion resistance and low conductivity due to the formation of oxide or hydroxide on the surface after aging. Although a stainless steel sheet with superior corrosion resistance used can show good corrosion resistance, it has a problem of conductivity due to the formation of strong bonded oxide on the surface Taking these problems into account, it is a technical objective of the present invention to provide a surface treated steel sheet and a connection terminal material produced thereof with superior conductivity, steadiness of conductivity after aging, corrosion resistance, and adhesion and with low contact resistance using a plated steel sheet which is a multi-layer plated steel sheet treated with diffusion having nickel plated layer at the lower layer and tin plated layer thereon on a stainless steel sheet as a plated base sheet.

SUMMARY OF THE INVENTION

The present invention has the characteristics of using a plated steel sheet treated with diffusion, which has nickel plated layer at the lower layer and tin plated layer thereon on a stainless steel sheet as plated base sheet, and having low contact resistance formed a coated film on a surface, including carbon black or graphite, carboxymethyl cellulose, and water borne organic resin.

It also has the characteristics of using a plated steel sheet treated with diffusion, which has nickel plated layer at the lower layer and tin plated layer thereon on a stainless steel sheet as plated base sheet, and having low contact resistance formed a coated film on a surface, including carbon black or graphite, carboxymethyl cellulose, water borne organic resin, and cross-linking agent of the water borne organic resin.

It is desirable that these surface treated steel sheets have any one of water borne organic resin such as acrylic resin, polyester resin, urethane resin, or phenol resin.

Moreover, a connection terminal having the characteristics of the surface steel sheet of the present invention, can be used for the contact part with carbon in an electric connection terminal.

DETAILED DESCRIPTION OF THE INVENTION

When a plated steel sheet having nickel plated layer at the lower layer and tin plated layer thereon on a stainless steel sheet as plated base sheet, which has been diffusion treated after these plating, is treated using a water-soluble solution of post treatment including carbon black or graphite, carboxymethyl cellulose, and water borne organic resins composed of acrylic resin, polyester resin, urethane resin, or phenol resin, deposited coated film, to prevent oxidation of the surface of the plated steel, shuts off oxygen in the air by avoiding the formation of an oxide film, which causes deterioration of conductivity, and suppresses deterioration of conductivity and corrosion resistance. Moreover, diminution of conductivity due to deposition of coated film is hardly observed, since the coated film contains carbon black or graphite having superior conductivity.

The operation mode of the present invention will be described in further detail mentioned below.

A stainless steel sheet is used as plated steel sheet. Iron-chromium stainless steel such as martensitic or ferritic stainless steel and iron-nickel-chromium stainless steel such as austenitic, austenitic-ferritic, martensitic, or semiaustenitic stainless steel can be used as stainless steel sheet. A plated steel sheet having nickel plated layer at the lower layer and tin plated layer thereon on a stainless steel sheet, which has been diffusion treated after these plating, can be selected. The plated steel sheet uses a stainless steel sheet as plated base sheet and it is preferable to use as connection terminal of lead storage battery or fuel cell which is easily exposed to acid atmosphere, because nickel-tin alloy which has superior chemical resistance exists on the surface layer of the plated layer. A suitable amount of plating is 0.3–30 $g/m^2$ of the total amount of nickel and tin plating. Plating amount of less than 0.3 $g/m^2$ is not preferable in case of performing the diffusion treatment after the plating, because the conductivity decreases extremely due to the diffusion of chromium in the surface layer which is a component of the stainless steel sheet. Plating amount over 30 $g/m^2$ is not favorable from economical point. Although the ratio of the amount of nickel plating and tin plating is not particularly limited, the amount of nickel plating of not less than two to that of tin plating of one is specially preferable from the viewpoint of corrosion resistance of the plated layer. The diffusion treatment is performed under nitrogen gas, hydrogen gas, mixed gas of nitrogen and hydrogen, or argon gas atmospheric condition without containing oxygen, and the heating temperature is preferable in the range of 400 to 600° C. From the viewpoint of contact resistance, the heating time is preferable in the range of a certain time without chromium diffusion which increases contact resistance or iron diffusion on the surface which causes rust.

The diffusion treated steel sheet after the plating is treated with a solution containing carbon black or graphite of 10–350 g/l, carboxymethyl cellulose of 0.1–40 g/l, and water borne organic resin of 1–200 g/l as solid matter composed from acrylic resin, polyester resin, urethane resin, or phenol resin.

Carbon black includes channel black, furnace black, acetylene black, or Katchen black. Graphite includes artificial graphite, flake graphite, flaky graphite, or amorphous graphite. The concentration of less than 10 g/l is insufficient for conductivity while the concentration above 350 g/l deteriorates dispersion of graphite extremely.

Any one type of water borne organic resin can be used, preferably water-soluble, water-dispersed, or emulsion type resin.

Water borne acrylic resin includes acrylic acid, acrylic acid ester, acrylamide, acrylonitrile, methacrylic acid, and polymer and copolymer of methacrylic acid esters. As functional group of ester, carboxyl group, amino group, methyl group, ethyl group, butyl group, amyl group, ethylhexyl group, or octyl group are included. Water borne ethyleneacrylic resin containing ethylene group can be also included.

Water borne polyester resin may be water-dispersed material by polyoxyethylene nonylphenylether, polyoxyethylene nonylphenylether sodium sulfate, sodium lauryl sulfate, or rosined soap, may be ones having hydrophilic radical including such as carboxyl group, sulfone group, sulfuric ester group, phosphoric ester group, amino group, ammonium salt, hydroxyl group, ether group, or amide group, or may be ones including alkyd resin, maleic acid resin, or unsaturated polyester.

Water borne urethane resin which has water-soluble COOH group or amine group in terminal group is included.

Water borne phenol resin includes resol type ones produced by reaction of phenol and formaldehyde under alkali catalyst.

In terms of water borne organic resin composed of acrylic resin, polyester resin, urethane resin, or phenol resin, the solid matter concentration of less than 1 g/l produces insufficient corrosion resistance, while the concentration exceeding 200 g/l produces drastic decrease of conductivity and increase of viscosity of treatment solution, making the uniform treatment difficult. Moreover, the cross-linings agent of the water borne organic resin above-mentioned can be added 0.1–20% to the solid matter of the said water borne organic resin. Table 1 shows types of usable cross-linking agent for the said water borne organic resin.

TABLE 1

Types of usable cross-linkmg agent

| Types of water borne organic resin | Types of usable cross-linking agent |
|---|---|
| Acrylic resin | (1) Compounds including hydrazide group |
| | (2) Compounds including epoxy group |
| | (3) Siloxane |
| | (4) Compounds including amino group |
| | (5) Epoxy resin |
| Polyester resin | (1) Compound of butylated melainine resin denatured by dimethylolpropionic acid |
| | (2) Compound of water borne block isocyanate block-polymerized by methylolphenol or methylethyl ketoxime |
| | (3) Compounds including epoxy and amine groups |
| | (4) Compounds including aziridine and carboxylic acid group |
| | (5) Hydrazine and diacetone acrylamide |
| | (6) Compounds including multivalent metal resulted from chelating agent such as zinc acetate or aluminum acetate |
| Urethane resin | (1) Methylated melamine resin |
| | (2) Epoxy resin |
| | (3) Metallic cross-linkage agent such as zinc complex |
| | (4) Aziridine compound |
| | (5) Isocyanate compound |
| | (6) Primary and secondary diamine and polyamine |
| | (7) Amino resin including primary and secondary diamine and polyamine |
| Phenol resin | (1) Epoxy resin |

When the concentration of the cross-linking agent above-mentioned is less than 0.1% to the solid matter concentration of the said water borne organic resin, there is no effect for adhesion. On the other hand, when the concentration is above 20%, the water borne organic resin above-mentioned is cross-linked rapidly and the precipitate is produced, and the stability of the treatment solution is deteriorated in a lapse of time.

Carboxymethyl cellulose containing sodium, potassium, or ammonium can be used. The concentration of carboxymethyl cellulose of less than 0.1 g/l produces deteriorated film of forming property or adhesion while the concentration over 40 g/l produces drastic decrease of dispersion.

The coating method may be but is not limited to spray coating, roll coating, knife coating, curtain flow coating, or reduction of area by roll or air knife after dip coating.

A suitable thickness dried of post treatment film is 0.02–10 μm. Since the thickness of less than 0.02 μm cannot cover the plated surface uniformly, corrosion resistance and conductivity is deteriorated in a lapse of time. When the thickness is over 10 μm, corrosion resistance tends to improve but conductivity is saturated, which is not economically preferable.

EXAMPLE

A stainless steel plate of 0.4 mm thickness was degreased and pickled, and then immediately after rinsing, nickel was electrodeposited on both sides of the steel sheet up to the amounts of plating of 2 g/m$^2$ using plating bath at 45° C. temperature containing nickel sulfate of 200 g/l and sulfuric acid of 50 g/l. After rinsing, nickel was electrodeposited on them up to the amounts of plating of 18 g/m$^2$ using Watts bath. After rinsing, tin was plated on them up to the amounts of plating of 5 g/m$^2$ using ferrostan bath. After plating, the diffusion treatment was performed at 500° C. for 3 hours in the atmosphere containing nitrogen gas of 95% and hydrogen gas of 5%. After diffusion treatment, the treatment solution as post treatment of the present invention including artificial graphite of 320 g/l and sodium salt of carboxymethyl cellulose of 2 g/l was produced. After dipping in the said solution, the sheet was reduced the area by roll up to the thickness of 4 μm after drying and was dried at 70° C., then the test piece for evaluation was produced.

Next, several samples were produced using various types of stainless steel sheet, the amount of nickel plating, the amount of tin plating, and condition of diffusion treatment (examples 1–30). Tables 2–6 show various types of stainless steel sheet, types of plating, and the amount of plating. In these tables, Table 2 shows the case of iron-chromium stainless steel used, Table 3 shows the case of iron-nickel-chromium stainless steel used as stainless steel sheet, respectively.

TABLE 2

The case of iron-chromium stainless steel sheet used as plated base sheet

| Examples | Type of stainless steel sheet (JIS name) | Plated steel sheet: Type of plating | Amounts of plating ($g/m^2$) | Diffusion treatment |
|---|---|---|---|---|
| Example 1 | SUS 430 | Upper layer: Sn<br>Lower layer: Ni | 5<br>20 | 500° C. for 3 hours soaking |
| Example 2 | SUS 410 | Upper layer: Sn<br>Lower layer: Ni | 0.7<br>1.4 | 450° C. for 8 hours soaking |
| Example 3 | SUS 409L | Upper layer: Sn<br>Lower layer: Ni | 10<br>20 | 600° C. for 1 hour soaking |
| Example 4 | SUS 403 | Upper layer: Sn<br>Lower layer: Ni | 3<br>9 | 550° C. for 1 hour soaking |
| Example 5 | SUS 405 | Upper layer: Sn<br>Lower layer: Ni | 0.5<br>1.0 | 550° C. for 8 hours soaking |
| Example 6 | SUS 429 | Upper layer: Sn<br>Lower layer: Ni | 2<br>28 | 500° C. for 1 hour soaking |
| Example 7 | SUS 431 | Upper layer: Sn<br>Lower layer: Ni | 2<br>4 | 400° C. for 8 hours soaking |
| Example 8 | SUS 410L | Upper layer: Sn<br>Lower layer: Ni | 0.2<br>15 | 600° C. for 1 hour soaking |
| Example 9 | SUS 403 | Upper layer: Sn<br>Lower layer: Ni | 0.1<br>0.2 | 400° C. for 5 hours soaking |

TABLE 3

The case of iron-chromium-nickel stainless steel sheet used as plated base sheet

| Example or comparative example | Type of stainless steel sheet (JIS name) | Plated steel sheet: Type of plating | Amounts of plating ($g/m^2$) | Diffusion treatment |
|---|---|---|---|---|
| Example 10 | SUS 304L | Upper layer: Sn<br>Lower layer: Ni | 0.2<br>0.5 | 450° C. for 8 hours soaking |
| Example 11 | SUS 316 | Upper layer: Sn<br>Lower layer: Ni | 1<br>5 | 600° C. for 0.5 hours soaking |
| Example 12 | SUS 317 | Upper layer: Sn<br>Lower layer: Ni | 5<br>15 | 550° C. for 3 hours soaking |
| Example 13 | SUS 329J2L | Upper layer: Sn<br>Lower layer: Ni | 1<br>5 | 400° C. for 4 hours soaking |
| Example 14 | SUS 384 | Upper layer: Sn<br>Lower layer: Ni | 2<br>5 | 500° C. for 1 hour soaking |
| Example 15 | SUS 310S | Upper layer: Sn<br>Lower layer: Ni | 4<br>13 | 450° C. for 6 hours soaking |
| Example 16 | SUS 321 | Upper layer: Sn<br>Lower layer: Ni | 3<br>20 | 600° C. for 8 hours soaking |
| Comparative example 1 | SUS 430 | — | — | — |

Comparative Example 1

Sample of Comparatine example 1 was produced by using the same stainless steel sheet as Example 1 without plating and the same post treatment as Example 1.

The characteristic of samples obtained from Examples and Comparative examples was evaluated by the method mentioned-below, and the results are shown in Table 4.

TABLE 4

Results of characteristic evaluations

| Example or comparative example | Corrosion resistance | Contact resistance ($m\Omega/cm^2$): Initial time | Contact resistance ($m\Omega/cm^2$): After aging | Adhesion of post treatment film |
|---|---|---|---|---|
| Example 1 | 10 | good | good | fair |
| Example 2 | 10 | good | good | good |
| Example 3 | 10 | good | good | good |
| Example 4 | 10 | good | good | good |
| Example 5 | 10 | good | good | good |
| Example 6 | 10 | good | good | good |
| Example 7 | 10 | good | good | good |
| Example 8 | 10 | good | good | good |
| Example 9 | 10 | good | good | good |
| Example 10 | 10 | good | good | good |
| Example 11 | 10 | good | good | good |
| Example 12 | 10 | good | good | fair |
| Example 13 | 10 | good | good | fair |
| Example 14 | 10 | good | good | fair |
| Example 15 | 10 | good | good | fair |
| Example 16 | 10 | good | good | good |
| Comparative example 1 | 10 | good | poor | good |

The present invention showed superior corrosion resistance, conductivity, steadiness of conductivity in a lapse of time, and adhesion of post treatment film.

Characteristic evaluations shown in Table 4 was examined as follows: Corrosion resistance Samples were set in the equilibrated vessel of 75° C. and 90% RH for 700 hours, then the degree of rust generated on the surface was evaluated. The evaluation method used was that of rating number.

Contact resistance

A carbon sheet of 0.5 cm thickness, 1.5 cm width, and 1.5 cm length was sandwiched between two pieces of sample of 1.5 cm width and 2 cm length at 6 $kg/cm^2$ pressure, and the contact resistance between samples was measured with a multimeter (HIOKI 3225 manufactured by HIOKI DENKI Co., Ltd.), and then conductivity was indicated by the contact resistance per contact area. The contact area of the carbon sheet and the sample was 2.25 $cm^2$. The contact resistance was measured at the initial time and after 840 hours under the equilibrated atmosphere of 75° C. and 90% RH. The contact resistance of less than and including 100 $m\Omega/cm^2$ was mentioned as "good" and over 100 $m\Omega/cm^2$ was indicated as "poor".

Adhesion of post treatment film

Adhesion of post treatment film with the shape of plate sheet was evaluated by the compulsory peeling with Scotch tape. No peeling was indicated as "good", peeling of the uppermost surface layer was indicated as "fair", and peeling at the interface between plating layer and post treatment film layer was indicated as "poor".

As shown in Table 4, the plated steel sheet performed post treatment of the present invention, which is used stainless steel sheet as plated base sheet, can be obtained the plated steel sheet with superior corrosion resistance, conductivity, steadiness of conductivity after aging, and adhesion of post treatment film.

We claim:

1. A surface treated steel sheet with low contact resistance comprises:

a. a steel sheet which is coated with a nickel-tin alloy;

b. a film formed on the nickel-tin alloy coated steel sheet of (a), which film comprises carbon black or graphite, carboxymethyl cellulose, and a water borne organic resin.

2. The surface treated steel sheet according to claim 1 wherein the water borne organic resin is selected from the group consisting of acrylic resins, polyester resins, urethane resins, phenol resins, and mixtures thereof.

3. The surface treated steel sheet according to claim 1 wherein the steel sheet is iron-chromium stainless steel or iron-nickel-chromium stainless steel.

4. A connection terminal comprising the surface treated steel sheet according to claim 1 in contact with carbon in an electric connection terminal.

5. A surface treated steel sheet with low contact resistance comprises:

a. a steel sheet which is coated with a nickel-tin alloy wherein said coated steel sheet is formed by plating nickel onto the steel sheet plating tin onto the nickel-plated steel sheet, and subjecting the plated steel sheet to difussion to form a nickel-tin alloy; and b. a film formed on the steel nickel-tin alloy coated sheet of (a), which film comprises carbon black or graphite, carboxymethyl cellulose, and a water borne organic resin and a cross-linking agent for the water borne organic resin.

6. The surface treated steel sheet according to claim 5 wherein the water borne organic resin is selected from the group consisting of acrylic resins, polyester resins, urethane resins, phenol resins, and mixtures thereof.

7. The surface treated steel sheet according to claim 5 wherein the steel sheet is iron-chromium stainless steel or chromium-nickel-chromium stainless steel.

8. A connection terminal comprising the surface treated steel sheet according to claim 5 in contact with carbon in an electric connection terminal.

9. A process for producing a surface treated steel sheet with low contact resistance comprising:

a. plating nickel onto the steel sheet;

b. plating tin onto the nickel-plated steel sheet;

c. subjecting the plated steel sheet to diffusion to form a nickel-tin alloy;

d. coating said diffused steel sheet with a coating comprising carbon black or graphite, carboxymethyl cellulose, and a water borne organic resin.

10. The process according to claim 9 wherein the water borne organic resin is selected from the group consisting of acrylic resins, polyester resins, urethane resins, phenol resins, and mixtures thereof.

11. The process according to claim 9 wherein the steel sheet is iron-chromium stainless steel or iron-nickel-chromium stainless steel.

* * * * *